June 4, 1940.　　　　　V. HOOVER　　　　　2,203,149
VARIABLE SPEED DRIVE SYSTEM
Filed Feb. 11, 1935　　　4 Sheets-Sheet 1
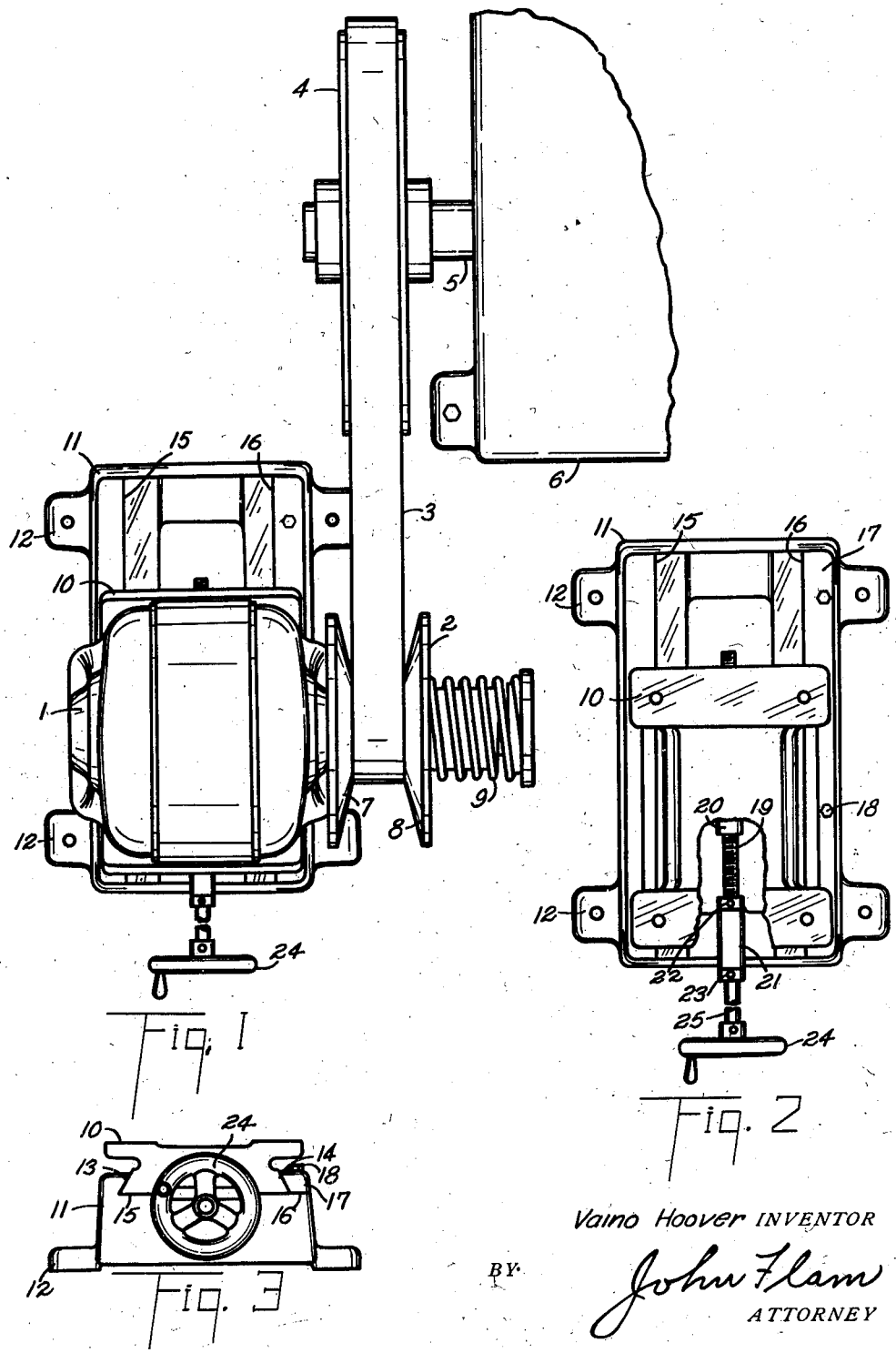
Vaino Hoover INVENTOR
BY John Flam
ATTORNEY

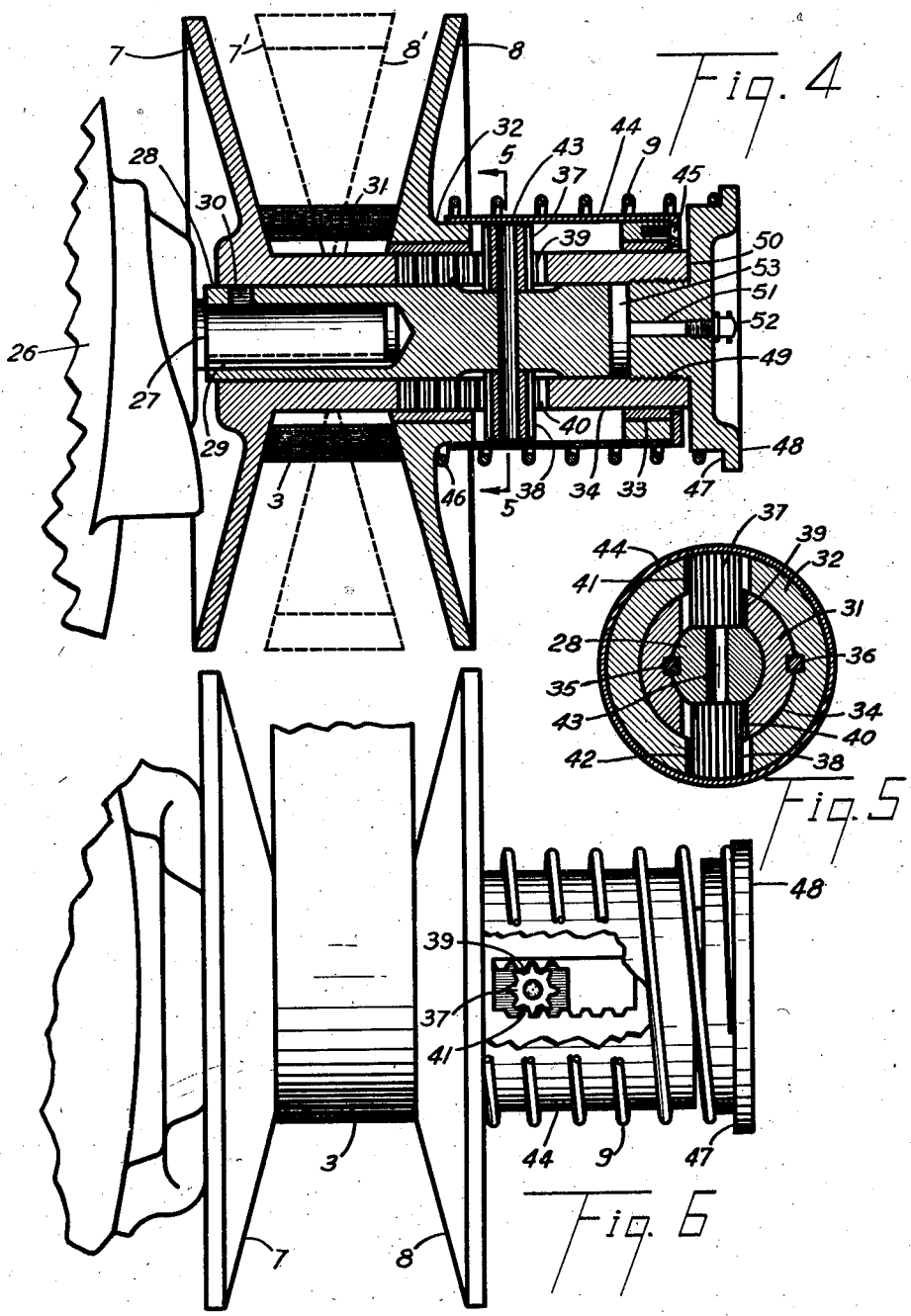

June 4, 1940.  V. HOOVER  2,203,149
VARIABLE SPEED DRIVE SYSTEM
Filed Feb. 11, 1935   4 Sheets-Sheet 3
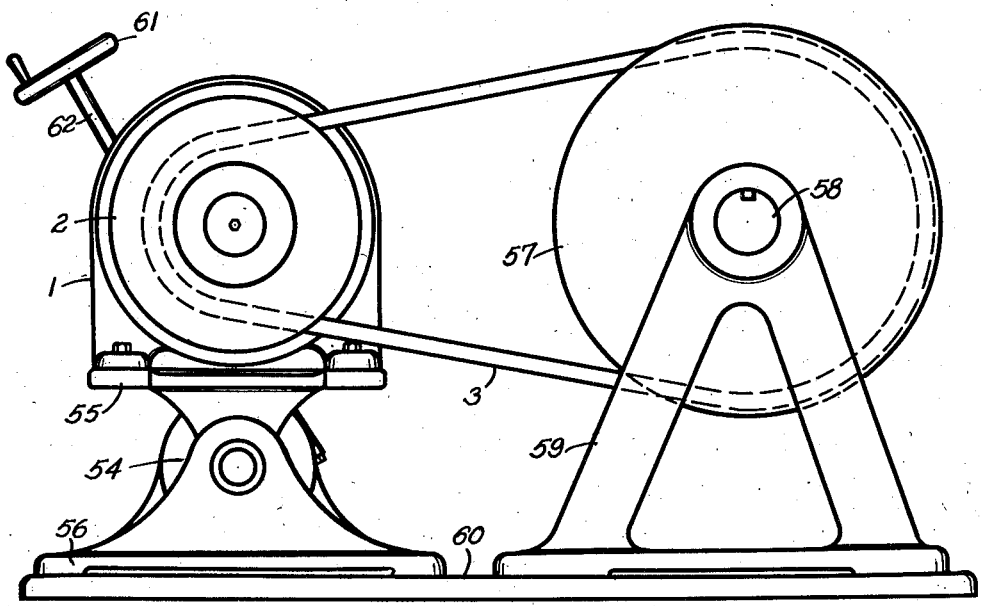
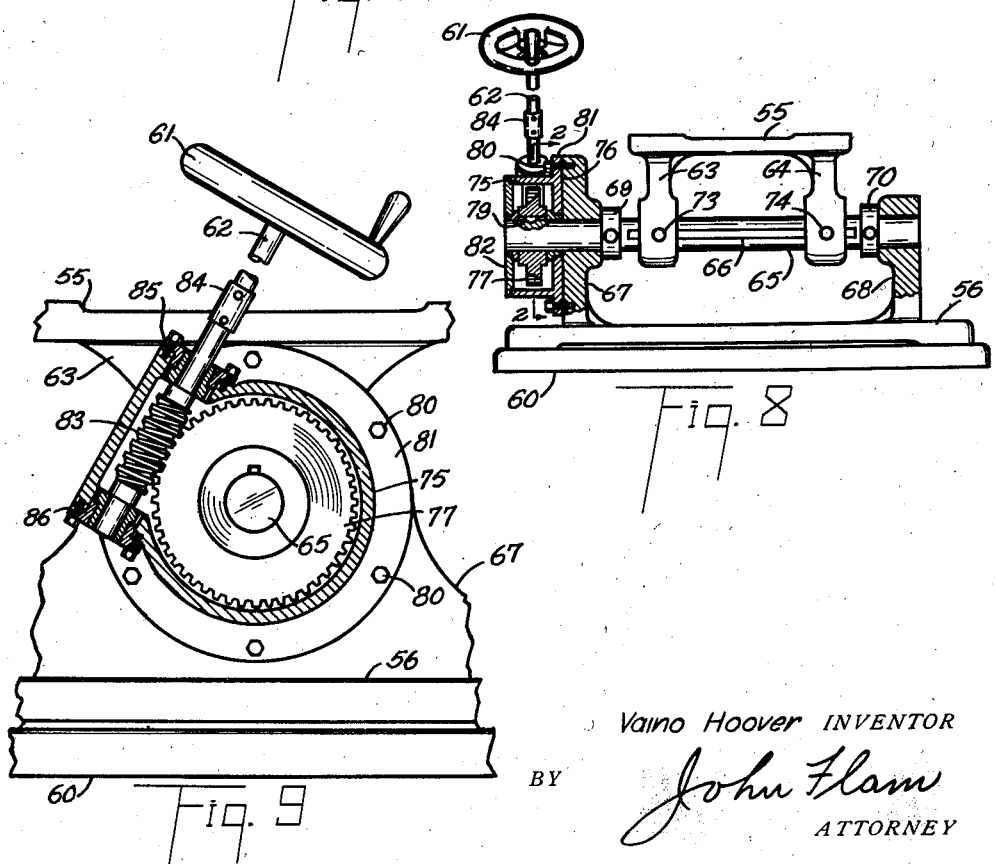
Vaino Hoover INVENTOR
BY John Flam
ATTORNEY June 4, 1940.   V. HOOVER   2,203,149
VARIABLE SPEED DRIVE SYSTEM
Filed Feb. 11, 1935   4 Sheets-Sheet 4
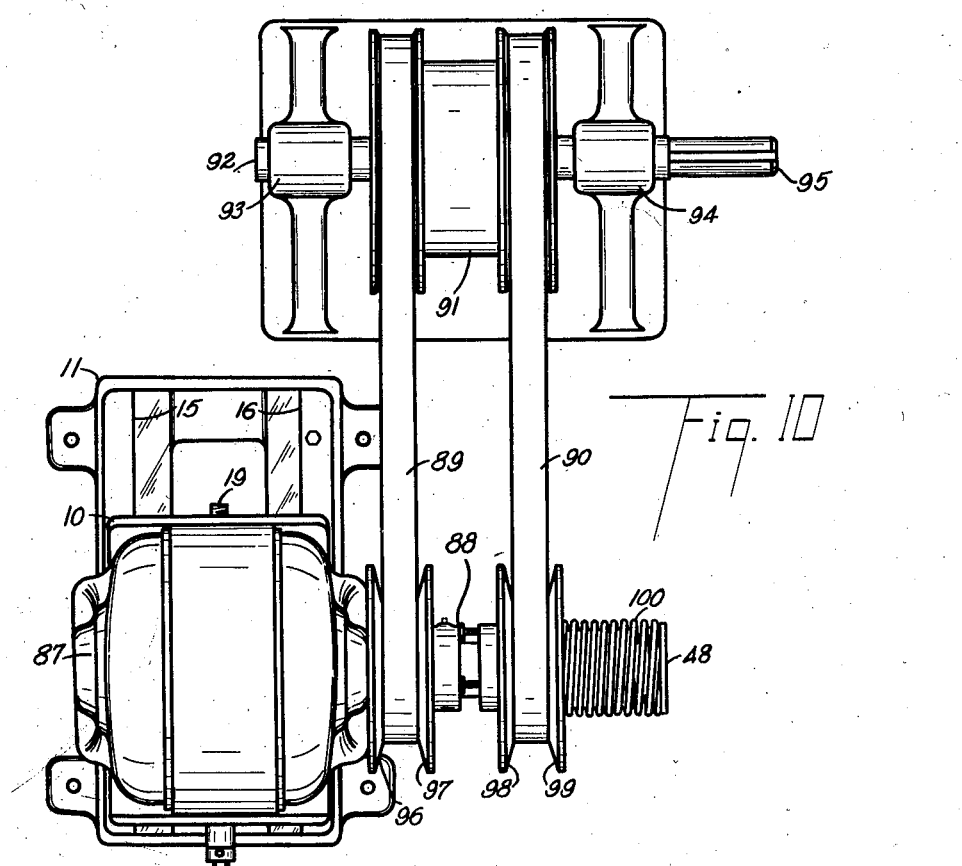
Vaino Hoover INVENTOR
BY John Flam
ATTORNEY Patented June 4, 1940

2,203,149

UNITED STATES PATENT OFFICE 2,203,149

VARIABLE SPEED DRIVE SYSTEM

Vaino Hoover, Los Angeles, Calif., assignor to U. S. Electrical Motors, Inc., a corporation of California Application February 11, 1935, Serial No. 5,899

3 Claims. (Cl. 74—230.17)

This invention relates to an adjustable speed drive and more particularly to an integral construction, incorporating an electric motor in driving relation to a driving pulley structure, a driven pulley structure in driving relation to a load driving shaft and a belt for transmitting power from the driving pulley structure to the driven pulley structure, at least one of the pulley structures having an adjustable effective pulley diameter whereby the variation of speed ratio is obtained.

Such an adjustable pulley structure may include a pair of pulley sections having opposed inclined faces forming a seat for a wedge-shaped driving belt. In order to provide means for adjusting the effective diameter of the pulley structure the sections are made relatively axially adjustable. In this way the inclined faces can be brought closer together causing the belt to be urged radially outward to produce an increased effective diameter; or they can be separated causing the belt to contact with the inclined faces at a shorter radial distance to produce a decreased effective diameter.

In the particular form of the device to be described hereinafter the adjustable speed drive has one pulley structure having an adjustable effective pulley diameter and one pulley structure which may have a fixed effective diameter. The belt or power transmitting member employed has a substantially constant effective length. This gives rise to the problem of adjusting a belt of constant length to pulleys of relatively variable effective diameter. When only one adjustable diameter pulley structure is employed the belt may be maintained in active driving relation to the pulley structures by adjusting the center distance between the axes of the two pulley structures simultaneously with the adjustment of the adjustable diameter pulley structure. Thus in constructions employing one adjustable diameter pulley structure, and in which the center distance is variable, it is necessary to provide means whereby the center distance and the diameter of the adjustable pulley structure may be adjusted at the relative rates required by the pulley diameters and the belt length. There is, however, no constant relation between the rate of change of the center distance and the rate of change of the diameter of the adjustable pulley structure, as the diameter of the adjustable pulley is not a simple function of the center distance but is also a function of the belt length and the diameter of the other pulley structure.

In the construction to be described hereinafter this problem is solved by providing positive means for adjusting the center distance between the axes of the two pulley structures and resilient means for adjusting the diameter of the adjustable pulley structure to the value required by the adjusted center distance.

One form of the adjustable pulley structure which might be employed in the adjustable speed drive consists of two conical pulley sections urged into contact with the belt by means of a spring, one of the pulley sections being directly fastened to the motor shaft and the other of the pulley sections being urged by the spring toward the fixed pulley section. When the diameter of the adjustable pulley structure is changed, the belt is moved axially with respect to each of the pulley sections. Thus, if one of the pulley sections is fastened to the motor shaft, it is necessary to move the entire motor structure in an axial direction if it is desired to maintain the belt in alignment. The rate at which the motor and the pulley section attached to the motor shaft must be moved axially is directly proportional to the rate at which the diameter of the adjustable pulley structure is changed. This, however, does not bear a constant relation to the rate of change of the center distance. Thus the rate at which the motor and the pulley section attached to the motor shaft should be moved axially is also the function of the pulley diameters and the adjusted value of the center distance. The condition of belt alignment can therefore only be approximately satisfied in any given construction and a different rate of axial adjustment is required of the pulley supporting structure for each belt length and pair of pulley diameters.

It is an object of this invention to obviate this difficulty by providing a resiliently adjusted pulley structure, in which each of the pulley sections are axially adjustable with respect to the supporting shaft, and in which interlocking means are provided for moving the pulley sections by equal and opposite increments with respect to the driving belt.

It is another object of this invention to provide an adjustable speed drive having a variable center distance between the driving and driven pulleys, in which the same means may be employed for adjusting the center distance irrespective of the particular pulley diameters and belt length.

It is still another object of this invention to provide an adjustable speed drive in which the adjustable pulley structure may be mounted directly on a standard motor shaft, and which thereby permits the use of a driving motor of standard construction.

It is still another object of this invention to provide an adjustable pulley structure in which the opposing pulley sections are adjusted by equal and opposite increments and in which the means for interlocking the axial adjustment of the pulley sections is required to transmit only the difference between the frictional forces opposing the axial movements of the pulley sections.

In many variable speed power applications the speed required by the driven machine is much less than that provided at the driving shaft of the motor. This reduction in speed may be obtained by employing reduction gearing between the driven pulley of the adjustable speed drive and the driven machine; or the driven pulley structure of the adjustable speed drive may be mounted directly on the driving shaft of the driven machine and the reduction in speed may be obtained by the use of appropriate diameters for the driving and driven pulleys.

In this invention one of the pulley structures may be mounted on the motor shaft and the other pulley structure may be mounted on the load driving shaft, which is in active driving relation to the driven load. The diameter of the driven pulley structure is thus directly determined by the diameter of the driving pulley structure and the reduction in speed which is required between the driving electric motor and the load driving shaft. Thus where a large reduction in speed is required the diameter of the driven pulley structure is much greater than that of the driving pulley structure. Large diameter V type pulleys are expensive to construct. Thus in constructions of this type it is advantageous to use a flat faced driven pulley if it is possible. However, unless the belt is maintained in accurate alignment at all times, the belt will not stay on a flat faced driven pulley.

It is accordingly still another object of this invention to provide an adjustable speed drive having an adjustable diameter pulley structure and in which the center distance between the driving and driven pulleys is variable, in which means are provided for maintaining the belt in accurate alignment, whereby a flat faced driven pulley of minimum width may be employed.

It is still another object of this invention to provide an adjustable speed drive, in which means are provided for compensating for belt wear and elongation and in which belt wear does not produce misalignment of the driving belt.

It is still another object of this invention to provide a multiple belt adjustable speed drive, in which the center distance between the driving and driven pulleys is variable and in which means are provided for maintaining each of the belts in perfect alignment.

This invention possesses many other advantages and has other objects which may be made more easily apparent from a consideration of several embodiments of the invention. For this purpose there are shown several forms in the drawings accompanying and forming a part of the present specification. These forms will now be described in detail which illustrate the general principles of the invention; but it is to be understood that this detailed description is not to be taken in a limiting sense since the scope of the invention is best defined by the appended claims.

Referring to the drawings:

Figure 1 is a plan view of an adjustable speed drive embodying the invention. This view illustrates in particular the means provided for adjusting the center distance between the driving and driven pulley structures, the means whereby the adjustable pulley structure is supported by the motor shaft and the manner in which the driven pulley structure may be mounted directly on the driving shaft of a driven machine.

Figure 2 is a plan view of the motor supporting structure of Figure 1 and illustrates in particular the means provided for movably supporting the motor to vary the center distance between the driving and driven pulley structures.

Figure 3 is a side elevation of the motor supporting structure of Figure 1, taken from the front of Figure 1 and illustrates the means provided for guiding the movement of the supported motor and pulley structure.

Figure 4 is a detailed view of the adjustable pulley structure of Figure 1 and illustrates the means provided for interlockingly adjusting the axial positions of the pulley sections by equal and opposite increments. This view is partly in section taken along the axis of the motor shaft.

Figure 5 is a sectional view of the adjustable pulley structure of Figure 4 taken along the line 1—1.

Figure 6 is a detailed view of the adjustable pulley structure, taken from the top of Figure 4 and with a portion of the protecting housing removed.

Figure 7 illustrates another form of the adjustable speed drive of Figures 1 to 3. In this form the driving motor and adjustable pulley structure are pivotally supported to vary the center distance between a driving and driven pulley structures.

Figure 8 is a detailed view of the pivotal support of Figure 7, taken from the left hand side of Figure 7. This view is partly in section, taken along the axis of the shaft forming the pivot.

Figure 9 is a sectional view taken through the gear housing of Figure 8 along the line 2—2.

Figure 10 is a plan view of another form of the adjustable speed drive, in which means are provided for employing multiple-belt pulleys.

Figure 11 is a detailed view of the multiple belt adjustable diameter pulley employed in the construction of Figure 10. This view is partly in section, taken along the axis of the motor shaft.

Figure 12 is a sectional view, taken along the line 3—3 of Figure 11.

Referring to Figure 1, the adjustable speed drive is formed by the driving electric motor 1, which is in driving relation to the adjustable pulley structure 2, mounted on the motor shaft, and which by means of the belt 3 drives the pulley structure 4, mounted on the driving shaft 5 of the driven machine 6. The driven pulley 4 is illustrated as a flat-faced pulley having a diameter considerably greater than that of the adjustable diameter driving pulley 2. However, it is to be understood that a V-type pulley may be employed for the fixed diameter pulley if desired and that it is particularly desirable to employ a V-type pulley for the fixed diameter pulley, when the driving and driven pulley structures are of comparatively equal diameter. The driving pulley structure 2 is formed by the pulley sections 7 and 8, which have opposed inclined belt engaging faces, forming by relative axial adjustment variable effective pulley diameters. For instance, if it is desired to increase the effective diameter of the adjustable pulley structure, the pulley sections 7 and 8 are moved by equal increments toward the driving belt 3. This movement of the pulley sections toward each other forces the driving belt radially outward to define a larger effective diameter. Conversely a separating movement of the pulley sections allows the belt to move radially inward to define a smaller effective diameter. The pulley sections are constantly urged into driving relation with the belt by means of the spring 9. The means whereby the spring 9 adjusts the axial positions of the pulley sections will be described in connection with Figures 4 to 6.

It is obvious from the construction that as the diameter of the adjustable pulley structure is increased, that the driving and driven pulleys must be moved toward each other to provide the center distance required by the belt length. Conversely when the diameter of the adjustable pulley structure is decreased the center distance between the pulley structures must be increased to adjust the belt to the decreased pulley diameter. In the present instance the center distance between the driving and driven pulley structures is positively adjusted and the diameter of the adjustable pulley structure is resiliently adjusted by means of the spring 9 to the diameter required by the adjusted center distance. To provide means for adjusting the center distance between the pulley structures the driving motor 1 is mounted on the sliding motor base 10, which in turn is supported by the sub-base 11. The sub-base 11 is provided with appropriate feet 12 for securing the motor supporting structure to the supporting foundation.

The movement of the sliding base 10 with respect to the sub-base 11 is guided by the tongue and groove construction formed by the engagement of the tongue members 13 and 14, Figure 3, formed on the sliding base, with the grooves 15 and 16 formed on the sub-base. One side of the groove 16 is formed by the adjustable member 17, which provides means for adjusting the sliding clearance between the tongue members and the grooves. The adjustable member 17 is held in place by means of the bolts 18 which pass through appropriate slots formed in the member 17 and which are threaded into the sub-base. By means of the construction provided the movement of the supported motor and adjustable pulley structure is so guided that the supporting shafts of the driving and driven pulleys are maintained parallel and the belt is maintained in alignment.

The means provided for adjusting the position of the sliding base 10 and the supported motor and pulley structure is illustrated by Figure 2, which is a plan view of the motor supporting structure with the driving motor removed. Referring to Figure 2: the position of the sliding base is adjusted by means of the lead screw 19, which threadedly engages the bushing 20, secured to the sliding base 10 and which is rotatably supported by means of the bushing 21 secured to the sub-base. The axial position of the lead screw 19 is fixed by means of the collars 22 and 23 which are suitably secured to the lead screw and which abut against the ends of the bushing 21. The rotation of the lead screw may be suitably actuated by means of the handwheel 24 which is secured to the projecting end 25 of the lead screw. It is to be understood that the end 25 of the lead screw which projects past bushing 21 may be extended to as great a distance as is desired, if it is desired to adjust the speed ratio of the adjustable speed drive from a remote location. It is obvious from the construction that the rotation of the handwheel 24 produces a corresponding adjustment of the center distance between the axes of the pulley structures and the resultant adjustment of the speed ratio.

The adjustable pulley structure 2 of Figure 1 is illustrated in detail by Figures 4 to 6. Referring to Figure 4; the driving motor has the motor shaft 27 which projects from the motor frame 26 and which has supported thereon the shaft extension 28. The member 28 is suitably keyed to the motor shaft by the key 29 and is held against axial movement by the set screw 30. The pulley section 7 is provided with the axially extending hub 31, which is slidably supported on the shaft extension 28. The pulley section 8 is provided with the hub 32, which by means of the bushing 33 is slidably supported on the exterior surface 34 of the hub 31. The bushing 33 may be formed of a lubricant retaining bearing material to reduce to a minimum the frictional force between the bushing and the supporting surface 34. In order to provide a construction having increased mechanical strength the bushing 33 is formed in two parts located adjacent to either end of the hub 32. Thus the central portion of the hub may be formed of a material having a greater mechanical strength than the bearing material forming the bushing 33.

The driving connection between the pulley section 7 and the shaft extension 28 is formed by the key 35, Figure 5, which engages the member 28 and the hub 31 of the pulley section. The pulley section 8 is in turn rotated together with the pulley section 7 by the engagement of the key 36 with the hubs 32 and 31 of the pulley sections.

The axial movement of the pulley sections is interlocked by means of the gears 37 and 38 which respectively engage the racks 39 and 40, formed in the hub 31 of the pulley section 7, and the racks 41 and 42, formed in the hub 32 of the pulley section 8. The gears 37 and 38 are rotatably supported in fixed axial position with respect to the shaft extension 28 by the pin 43 which passes through the gears and the shaft extension. The gears 37 and 38 and the pin 43 are held in position by the protecting housing 44 which telescopes over the hub of the pulley section 8 and which is held in position by means of the screws 45, as illustrated by Figure 4. The racks 39 and 40, formed in the hub 31, are formed on one side of the gears and the racks 41 and 42, formed in the hub 32, are formed on the other side of the gears. Thus as viewed in Figure 5, the racks 39 and 40 are formed to the right of the gears and the racks 41 and 42 are formed to the left of the gears. The manner in which the engagement of the gears with the racks, formed in the pulley hubs, interlocks the axial adjustment of the pulley sections is best illustrated by Figure 6, which is a view of the pulley structure taken from the top of Figure 4 and with a portion of the protecting housing cut away. Referring to Figure 6; the gear 37 engages the rack 41, formed in the hub 32, and the rack 39, formed in the hub 31. Thus if the pulley section 8 is moved toward the left the engagement of the rack 41 with the gear 37 causes the gear to rotate and the engagement of the gear 37 with rack 39 causes the rack 39 and the pulley section 7 to be moved an equal distance toward the right. Thus when one of the pulley sections is moved in an axial direction the other pulley section must also move an equal distance in the opposite axial direction. Thus the pulley sections are at all times interlockingly adjusted by equal and opposite increments with respect to the driving belt. In order to insure that the load will be equally divided between the gears 37 and 38, both of the racks formed in the hub of a single pulley section may be formed in perfect alignment by broaching both of the racks in the pulley hub at the same time.

The means whereby the spring 9 adjusts the diameter of the pulley structure is best illustrated by Figure 4. One end of the spring 9 abuts against the shoulder 46 formed by the reverse side of the pulley section 8 and the other end of the spring abuts against the shoulder 47, formed on the removable cap 48. The cap 48 is provided with a threaded portion 49, which engages an internal thread formed in the end of the pulley hub 31. The cap is threaded into the end of the pulley hub until the radial surface 50, formed on the cap, comes into contact with the end of hub 31. The force exerted by the spring 9 on the cap serves effectively as a spring washer to lock the cap in position. It is obvious from the construction that the spring 9 urges the cap 48 and the pulley section 7 secured thereto toward the right and the pulley section 8 toward the left, as viewed in Figure 4. Thus the pulley sections 7 and 8 are constantly urged into contact with the driving belt 3. As has been previously described, the structure associated with the gears 37 and 38 causes the pulley sections to move by equal and opposite increments with respect to the driving belt. Thus, when the diameter of the adjustable pulley structure is increased the pulley section 7 moves to the position 7' and the pulley section 8 moves to the position 8', to increase the effective diameter of the pulley structure without moving the belt in an axial direction.

The construction provided is also of particular utility in that the adjustable pulley structure 2 provides automatic means for compensating for belt wear or elongation; for if the belt wears or is increased in length the spring 9 and gears 37 and 38 cause the pulley sections 7 and 8 to be moved toward the belt by equal increments, thus automatically maintaining the belt tension without producing any misalignment of the driving belt.

It is to be noted that the axial force exerted by the adjusting spring 9 is directly transmitted to the pulley sections 7 and 8 and is not imposed on the gears, which interlock the axial adjustment of the pulley sections. The gears 37 and 38 are required to transmit only the difference between the frictional forces between the bushing 33 and the hub 31 and between the hub 31 and the shaft extension 28; for if there were no frictional forces between the relatively slidable hubs, or if the frictional forces were exactly equal, then the pulley sections 7 and 8 would always be moved by equal and opposite increments by the spring 9, as the force exerted by the spring on both of the pulley sections is the same. However, it cannot be assumed that the interlocking means provided by the structure associated with the gears could be dispensed with, because the frictional forces between the relatively slidable pulley hubs will never be exactly equal; thus one of the pulley sections will always tend to make the entire axial movement required to adjust the pulley diameter and the driving belt will be thrown badly out of alignment. The interlocking means also provide means for maintaining the adjustable pulley structure in fixed axial position with respect to the motor shaft; for unless means are provided for fixing the position of the pulley sections with respect to the shaft extension 28 both of the pulley sections may move as a unit with respect to the motor shaft.

The construction provided is of particular utility as the adjustable pulley structure may be completely assembled independent of the motor shaft. Thus the pulley structures may be kept in stock fully assembled, and may be shipped to any desired locality and assembled on a motor shaft as readily as any fixed diameter pulley. This cooperation of the pulley structure may be illustrated in connection with Figure 4. Referring to Figure 4: when the driving belt 3 is removed from the pulley structure the pulley sections 7 and 8 are urged by the spring to their limiting maximum diameter position, thus giving access to the set screw 30, which holds the pulley structure to the motor shaft. The entire pulley structure may thus be removed as a unit from the motor shaft by removing the set screw. Similarly, to mount the pulley structure on the motor shaft it is only necessary to set the key 29 in position and fasten the pulley structure to the motor shaft by means of the set screw 30.

Suitable means are provided for lubricating the relatively slidable surfaces of the pulley structure. In the present instance the removable cap 48 is provided with the lubricant conducting passage 51, which is threaded to engage the pressure lubricating fixture 52. Thus lubricant may be injected through the passage 51 into the lubricant retaining chamber 53, formed within the hub 31. The centrifugal force created by the rotation of the pulley structure urges the lubricant from the lubricating chamber 53 to the supporting surfaces of the shaft extension 28 and the pulley hub 31 and to the supporting surfaces of the pulley section 8. The protecting housing 44 serves to prevent the escape of the lubricant from the pulley structure and together with the hubs 31 and 32 and the shaft extension 28 serves to provide a pair of lubricant retaining chambers for the gears 37 and 38.

Figures 7 to 9 illustrate another form of an adjustable speed drive, in which the adjustable pulley structure of Figures 4 to 6 may be employed. In this form the driving motor 1 is pivotally supported by the adjustable base 54, which is formed by the pivoting motor base 55 and the supporting base 56. The motor shaft has mounted thereon the adjustable pulley structure 2, which by means of the belt 3 drives a driven pulley 57, mounted on the load driving shaft 58. The load driving shaft 58 may be rotatably supported by means of the supporting structure 59 and may be provided with suitable means for engaging a driven load. The supporting base 56 and the supporting structure 59 of the driven pulley may be supported on the base plate 60 to provide a common support for the driving and driven pulley structures. The driven pulley 57 is illustrated as a V-type pulley and may be of the type commonly employed in fixed diameter V-belt drives.

The speed ratio is adjusted by means of the handwheel 61 and the rotatably supported rod 62, which adjust the angular position of the pivoting base 55 to vary the center distance between the driving and driven pulley structures. The means whereby the adjustment of the pivoting base 55 is produced by the rotation of the rod 62 is illustrated in detail by Figures 8 and 9.

Referring to Figure 8; the pivoting base 55 is provided with the supporting arms 63 and 64 which are supported on the shaft 65 and keyed thereto by the key 66. The shaft 65 is in turn rotatably supported on the upright arms 67 and 68, formed on the supporting base 56. The axial position of the shaft 65 is fixed by the contact of the collars 69 and 70 respectively with the arms 67 and 68. The pivoting base 55 may be held in fixed axial position with respect to the shaft 65 by means of the set screws 73 and 74, which are respectively threaded into the arms 63 and 64 and which secure the arms to the shaft. The set screws 73 and 74 provide means for adjusting the axial position of the pivoting base 55 with respect to the supporting base 56, thereby providing means for adjusting the axial position of the adjustable pulley structure to bring the belt into exact alignment.

It is obvious from the construction that a rotation of the shaft 65 produces a corresponding pivoting movement of the base 55 and the supported motor and driving pulley structure, thereby producing an adjustment of the center distance between the driving and driven pulleys and a corresponding variation in the speed ratio of the adjustable speed drive. To provide means for adjusting the angular position of the shaft 65 the gear housing 75 is removably secured to the face 76 of the upright arm 67. The gear housing 75 encloses a worm which is rotated by the handwheel 61 and the rod 62 and which engages the worm wheel 77 mounted on the shaft 65. The worm wheel 77 may be suitably keyed to the shaft by the key 79. The housing 75 may be secured to the arm 67 by means of the bolts 80 which pass through the flange 81 formed on the housing and which are threaded into the arm 67. The gear housing may be provided with the removable cover 82, which gives access to the worm wheel 77 and provides means whereby the worm wheel may be removed from the shaft 65

The construction of the gear housing is illustrated in detail by Figure 9, which is a sectional view of the gear housing taken from the left hand side of Figure 8 along the line 2—2. Referring to Figure 9: the worm 83 is suitably coupled to the rod 62 by means of the coupling 84. The worm 83 is rotatably supported on the removable cover plates 85 and 86, which provide means whereby the worm may be removed from the housing and which also provide means whereby the position of the worm may be reversed within the housing to change the position of the speed ratio adjusting handwheel to the opposite side of the gear housing. It is obvious from the construction that a rotation of the handwheel 61 produces a corresponding rotation of the worm wheel 77 and the resultant adjustment of the speed ratio of the adjustable speed drive. The angle of lead of the worm 83 may be made sufficiently small so that the worm effectively locks the worm wheel 77 in the adjusted position. The bolts 80, which hold the gear housing to the upright arm 67, are spaced at equal angular intervals so that the gear housing may be secured to the arm 67 in a plurality of angular positions to change the position of the speed ratio adjusting handwheel to the desired location.

By means of the construction provided the driving motor and the adjustable pulley structure may be mounted in any desired relation with respect to the adjustable base and the speed ratio adjusting handwheel. Thus, by reversing the position of the worm in the gear housing and by rotating the base 56, so that the arm 67 is on the right hand side, as viewed in Figure 8, the driving motor structure may be assembled so that the adjusting handwheel is at the right of the adjustable motor base, as viewed in Figure 8, and the motor may be mounted on the adjustable base so that the adjustable pulley structure is at the left of the base. It is also possible to mount the driving motor so that both the adjustable pulley structure and the speed ratio adjusting handwheel are on the same side of the motor base.

Figures 10 to 12 illustrate a form of the adjustable speed drive in which means are provided for employing multiple belt adjustable diameter pulleys. Referring to Figure 10: the adjustable speed drive is formed by the driving electric motor 87, which is in driving relation to the multiple belt adjustable diameter pulley 88 mounted on the motor shaft and which by means of the belts 89 and 90 drives the multiple belt pulley 91, mounted on the load driving shaft 92. The load driving shaft 92 may be provided with suitable bearing supports 93 and 94 and may be provided with a load driving extension 95 for engaging a driven load. The driven pulley 91 may be of the type commonly employed in multiple V-belt drives, however, the spacing and the width of the grooves for the belts must be determined from the dimensions of the adjustable diameter pulley 88.

As in the construction of Figures 1 to 3 the driving electric motor 87 is supported on the sliding motor base 10, which is in turn guided by and supported on the sub-base 11, and the center distance between the driving and driven pulleys may be adjusted by means of the lead screw 19 and the handwheel 24. It is of course obvious that the pivoting motor supporting structure of Figures 7 to 9 may also be employed for adjusting the center distance if it is desired.

The multiple belt adjustable diameter pulley 88 is formed by the pulley sections 96 and 97, which are in driving relation to the belt 89, and by the pulley sections 98 and 99 which are in driving relation to the belt 90. The pulley section 98 is axially fixed with respect to the pulley section 96 and the pulley section 99 is likewise axially fixed to the pulley section 97. Thus the effective diameters of the adjustable pulley structures formed by each pair of opposite facing pulley sections are adjusted by equal increments.

The construction of the multiple belt adjustable diameter pulley 88 is illustrated in detail by Figure 11. Referring to Figure 11: the driving motor has the motor shaft 101, which projects from the motor frame and which has supported thereon the shaft extension 102. The member 102 is suitably keyed to the motor shaft by the key 103 and is held against axial movement by the set screw 104. The pulley section 96 is provided with the axially extending hub 105, which is slidably supported on the shaft extension 102. The pulley section 99 is provided with the hub 106, which is slidably supported on the hub 105 by means of bushing 107. Bushing 107 is formed of lubricant retaining material and may be formed in two parts in the same manner as the bushing 33 of Figure 4. Pulley section 97 is provided with the hub 108 which is slidably supported on the hub 105 by means of the bearing bushing 109. The pulley section 97 is axially fixed to the pulley section 99 by means of a plurality of threaded rods 110, which are spaced at equal angular intervals. Each of the rods passes through the pulley sections 97 and 98 and is threaded into the pulley section 99. Each of the rods is provided with the flat head 111 and the lock nut 112, whereby it is secured to the pulley section 97 and is securely fixed in position by means of the set screw 113. The pulley section 98 may be suitably secured to the axially extending hub 105 by means of the set screw 114.

The driving connection between the pulley section 96 and the shaft extension 102 is formed by the key 115, Figure 12, which engages the member 102 and the hub 105 of the pulley section. The pulley sections 97, 98 and 99 are in turn rotated together with the pulley section 96 by the engagement of the key 116 with the hubs of the pulley sections. Thus the pulley structure is splined to the shaft extension.

It is obvious from the construction of Figures 11 and 12 that the effective diameter of the adjustable pulley structure formed by each pair of opposite facing pulley sections may be adjusted by moving the hub 105 of the pulley section 96, and the hub 106 of the pulley section 99 in opposite directions by equal increments. The axial movements of the pulley sections are interlocked by means of the gears 37 and 38, which respectively engage the racks 117 and 118 formed in the hub 105 and the racks 119 and 120 formed in the hub 106. The gears 37 and 38 are rotatably supported in fixed axial position with respect to the shaft extension 102 by the pin 43, which passes through the gears and the shaft extension. The protecting housing 44 of Figures 4 to 6 may again be employed to hold the gears in position and to enclose the interlocking mechanism. The engagement of the gears 37 and 38 with the racks formed in the hubs of the pulley sections interlocks the axial movements of the hubs 105 and 106 in the same manner as in the construction of Figures 4 to 6.

The pulley sections are resiliently urged into driving relation with the belts 89 and 90 by means of the spring 100, one end of which engages the shoulder 121, formed on the pulley section 99, and the other end of which engages the cap 48, secured to the hub 105.

It is obvious from the construction that each pair of opposite facing pulley sections are adjusted by equal and opposite increments with respect to their respective driving belt and that the effective diameter of the pulley structure formed by the pulley sections 96 and 97 is always equal to that of the pulley structure formed by the pulley sections 98 and 99. It is also obvious that the force exerted by the spring 100 is directly exerted on the pulley sections and that the gears 37 and 38 are required to transmit only the difference in the frictional forces opposing the axial movement of the hub 105 on the shaft extension 102 and of the bushings 109 and 107 on the hub 105. It is further to be noted that the multiple belt adjustable diameter pulley 88 may be directly supported on the motor shaft 101 without additional supporting structure.

I claim:

1. In an adjustable speed drive, a shaft, an adjustable pulley structure splined on said shaft and in driving relation thereto, said adjustable pulley structure including a pair of pulley sections having opposed inclined belt engaging faces, forming by relative axial adjustment variable effective pulley diameters, and means for adjusting the axial positions of said pulley sections by equal and opposite increments comprising, a member pivotally supported about an axis fixed with respect to said shaft and engaging said pair of pulley sections, whereby an axial adjustment of one pulley section results in an equal and opposite axial adjustment of the other pulley section, and means supported coaxially with respect to said structure for resiliently urging said pulley sections toward each other.

2. In an adjustable diameter pulley structure, a shaft, a pulley section having an inclined belt engaging face and a hub slidable on the shaft, another pulley section having an inclined belt engaging face opposed to the inclined face of the other section, as well as a hub slidable on the hub of the other section, resilient means for urging the sections toward each other, and means for ensuring that the sections will be equally adjusted in an axial direction, comprising a rack and gear mechanism, the gear having an axis transverse to the shaft and fixed with respect thereto, the rack having teeth formed in slots in the hubs and engaged by the gear.

3. In an adjustable diameter pulley structure, a shaft, a pulley section having an inclined belt engaging face and a hub slidable on the shaft, another pulley section having an inclined belt engaging face opposed to the inclined face of the other section, as well as a hub slidable on the hub of the other section, and means for ensuring that the sections will be equally adjusted in an axial direction, comprising a rack and gear mechanism, the gear having an axis transverse to the shaft and fixed with respect thereto, the rack having teeth formed in slots in the hubs and engaged by the gear.

VAINO HOOVER.